Oct. 15, 1946.     H. K. GANDELOT     2,409,483
ELECTRIC SWITCH
Filed Jan. 24, 1944     2 Sheets-Sheet 1

Inventor
HOWARD K. GANDELOT
Spencer, Hardman & Fehr
His Attorneys

Oct. 15, 1946.                H. K. GANDELOT                2,409,483
                               ELECTRIC SWITCH
                            Filed Jan. 24, 1944                2 Sheets-Sheet 2

INVENTOR
HOWARD K. GANDELOT
BY
Spencer, Hardman & Fehr
HIS ATTORNEYS

Patented Oct. 15, 1946

2,409,483

UNITED STATES PATENT OFFICE 2,409,483

ELECTRIC SWITCH

Howard K. Gandelot, Grosse Pointe, Mich., assignor to General Motors Corporation, Detroit, Mich., a corporation of Delaware Application January 24, 1944, Serial No. 519,425

8 Claims. (Cl. 200—159)

This invention relates to electric switches, and more particularly the push-type cooperating with a pedal of an automobile or other motor driven vehicles.

An object of the present invention is to provide a simple, compact and rugged switch having few operating parts that are easily assembled without the use of screws or rivets, and which is highly efficient and satisfactory in practical use.

Another object of the present invention is to provide a snap-action switch that, in response to a slight movement of a pedal control mechanism of the switch contacts will be abruptly closed or opened by a buckling movable contact. This object is accomplished by providing a switch having a yieldable closure member provided with a bumper portion, the bumper portion being located in the path of the pedal control mechanism. The switch is so arranged and located with respect to the movement of the operating pedal that the switch is in an open position when the pedal is in its normal position and upon a slight movement of the pedal from its normal position the switch is snapped into a closed position.

Another object of the present invention is to provide a snap-acting switch of the class described wherein the bridging member comprising a member of the self-snapping type which may be hermetically sealed within a housing for use in places where deleterious fluids, gases or the like is a detriment to the use of an unsealed switch, thus prolonging the life of the conducting elements.

Another object of the invention is to provide a type of a switch of the type specified which is so constructed and arranged that it can be attached to a pedal arm so that it will act as a bumper to prevent the pedal arm from hitting the floor board when the operator's foot is removed from the pedal.

Further objects and advantages of the present invention will be apparent from the following description, reference being had to the accompanying drawings wherein a preferred embodiment of the present invention is clearly shown.

Figure 1:
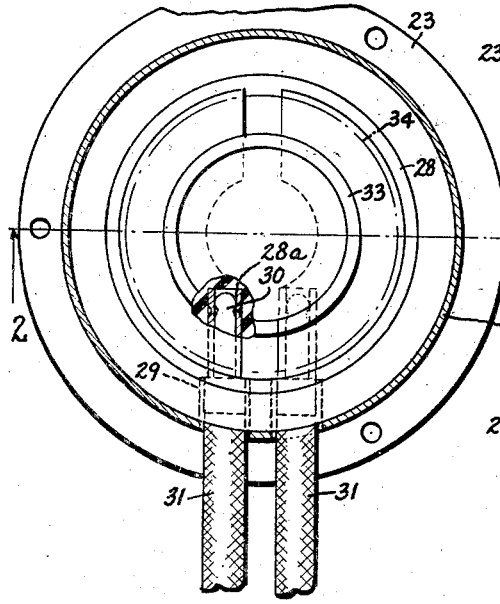
Fig. 1 is a view taken on line 1—1 of Fig. 2.
Figure 2:
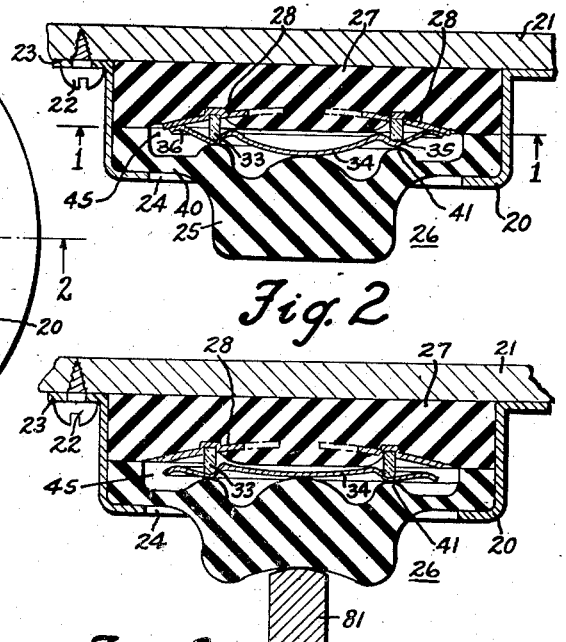
Fig. 2 is a sectional view taken on line 2—2 of Fig. 1 embodying the principles of the present invention and showing the switch in a closed position.
Figure 3:
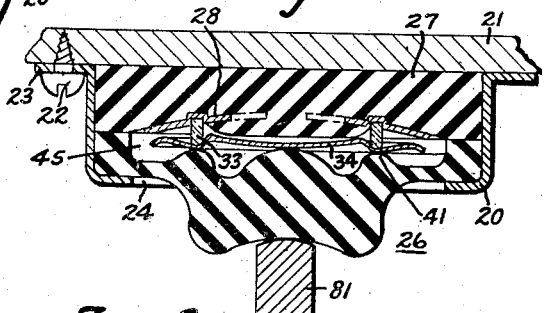
Fig. 3 is a sectional view similar to Fig. 2 showing the switch in its open position.

Referring to the Figs. 1, 2 and 3, a cup-shaped member 20 is secured to a toe-board or other suitable support 21 of an automobile by screws 22 passing through suitable apertures in a mounting flange 23 extending therefrom. The bottom wall of the member 20 is provided with an aperture 24 through which a bumper or actuator 25 of a switch assembly 26 projects.

The switch assembly 26 shown in Figs. 1, 2 and 3 comprises a base or support 27 preferably formed of an insulating material such as hard rubber or a molded plastic composition. A pair of spaced stationary contacts 28 are molded into the base member 27. In the present instance each stationary contact comprises an arcuate strip of phosphor-bronze having one end thereof bent under itself to provide socket 28a which is in alignment with a recess 29 formed in the base 27. Each recess 29 is adapted to receive a plug terminal 30 connected with one end of a cable 31. The inner faces of the base 27 and the stationary contacts are formed so as to provide an annular groove to receive an annulus 33 or arresting means of hard insulating material upon which rests a buckling dish-shaped disc or bridging member 34 of phosphor-bronze or other suitable conducting material. The disc 34 is formed with an annular groove 35 to receive the annulus 33. It is to be understood a leaf spring could be used, said spring being set in arcuate form. The disc 34 is curved at its peripheral edge 36 where it abuts the stationary contacts 28 which serves to provide a rubbing action to keep contacting surfaces of the contacts clean.

The bridging contact or disc 34 is held against the annulus 33 by a yieldable cup-shaped cover 40, preferably of soft rubber, including the actuator or bumper 25. The member 40 is provided with annular bead 41 which bears against the convex portion 35. Thus with the groove portion 35 of the disc 34 between the annulus 33 and the bead 41 the disc is prevented from moving laterally any substantial distance with respect to the base 27. The cover 40 and base 27 as shown in Fig. 1 are formed with an annular peripheral rim, the surfaces of which are, in this instance, substantially flat so that when the flat surfaces contact each other they form an effective seal against air paths, gases or fluids between the base and the closure. A thin coating of cement, such as wax or similar viscous insulating material applied to the surfaces will insure a hermetically sealed chamber 45 formed by the base and closure. The use of wax will permit slight variations of the surfaces and still maintain a hermetic seal.

Figure 4:
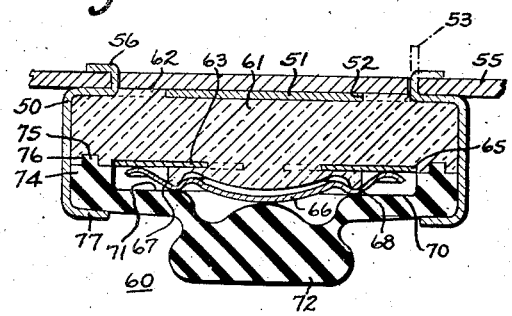
Fig. 4 is a sectional view of a modified form of the switch of the Fig. 1 embodiment.

In the modified form of the invention shown in Fig. 4 a cup-shaped member 50 is provided with bottom wall 51 which is pierced to provide apertures 52 and at the same time provide tangs 53. The tangs 53 are adapted to extend through suitable openings in a toe-board 55 and bent over, as at 56, to secure the cup-shaped member 50 in position on the toe-board. Before the member 50 is attached to the toe-board a switch assembly 60 is assembled within the cup member which comprises a base 61 of a hard molded insulating composition. The base is formed with lugs 62 extending into the apertures 52 which operate to prevent the base from turning within the member 50. A pair of combination contact and terminal assemblies are embedded in the base, each assembly including a conducting strip 63 having one end wrapped around a terminal screw, not shown, which is molded into the base and having the other ends 65 exposed to the inner face of the base so as to be engaged by a bridging member 66. The base 61 is formed with a projection having a bead 67 to receive an annular groove 68 formed in the disc 66. The head acts as a bearing for the disc 66. This disc has its periphery curved which abuts the exposed ends 65 of the contact assemblies.

The bridging member or disc 66 is held against the rib 68 by a cup-shaped enclosure 70 of soft rubber. In assembling the cup-shaped member a flat portion 71 of the enclosure engages the convex portion of the groove of the disc 66 whereby the disc is prevented from moving laterally with respect to the base. The center portion of the disc 66 is adjacent a bumper portion 72 of the closure. The closure 71 is provided with an annular flange 74 having an annular tongue 75 extending into a corresponding groove 76 formed in the base 61. The tongue has a snug fit with the groove to provide an effective seal between the base and closure. It is pointed out that the tongue and groove may be coated with a cement or wax in order to provide a hermetically sealed joint. The switch assembly is secured within the cup-shaped housing by spinning over the open end of the cup-shaped member to form a flange 77. The flange 77 overlies the closure to maintain the switch housing within the member 50.

The operation of either switch mechanism shown in Figs. 1 to 5 inclusive will be readily understood. In Fig. 3 the switch mechanism is shown with the central portion of the disc in a degree of flattening and in a circuit open position while Figs. 2 and 4, the switch mechanisms show the central portion of the discs 34 and 66 in their normal curvatures and in the circuit closed positions. It is to be understood that each switch operates in a similar manner, and also that when one of the switches is attached to the toe board the switch mechanism is normally held in an open position. Thus, when it is desired to close a circuit to a current consuming device shown diagrammatically in Fig. 5 the operator will manually depress a pedal 80 to move the arm 81 pivoted at 82. When the arm 81 is moved a certain distance to relieve the external pressure upon the bumper 25 the bridging disc will assume its normal shape as in Fig. 2, causing the peripheral portion of the buckling disc to snap into engagement with the stationary contacts. The resiliency of the disc holds the peripheral edge thereof in firm pressure engagement with the stationary contacts.

The snap action providing quick make and break of the periphery of the disc with the stationary contacts is obtained by distorting the material of the disc in a peculiar manner. In the present instance this distortion is accomplished by forming the disc with the annular groove. When the groove is formed there are set up in the disc opposing internal stresses tending to move the periphery of the disc out of the normal arc of the disc. The stresses created by the groove are less than the stresses created by the formation of a flat disc into dish-shape or arcuate form so that the normal stable position of the disc is as shown in Fig. 2. However when the disc is subjected to external pressure at the central portion of the disc the central portion tends to flatten out. This operation causes the stresses along the arc to be overcome and cause the periphery of the disc to move downwardly to the position shown in Fig. 3 with a snap action. The position shown in Fig. 3 is the unstable position of disc, thus when external pressure is removed the disc will return to its normal stable position.

Figure 5:
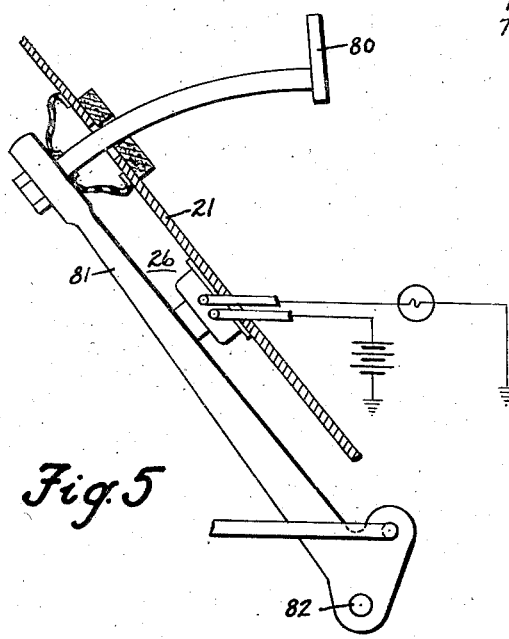
Fig. 5 is a diagrammatic view illustrating the switch controlled by a pedal of an automotive vehicle.
Figure 6:
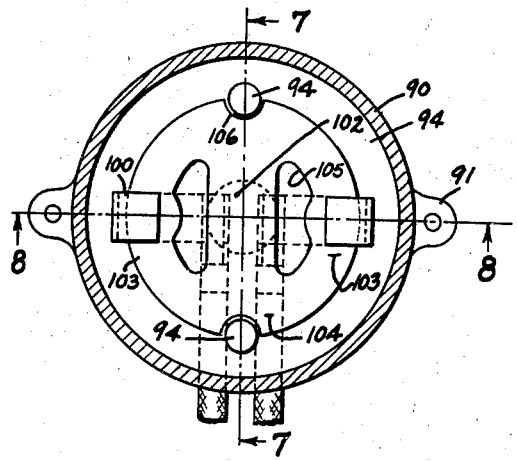
Fig. 6 is a sectional view taken on line 6—6 of Fig. 7 showing a further modification of the present invention.
Figure 7:
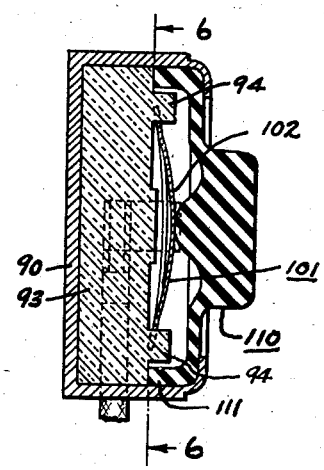
Fig. 7 is a sectional view taken on the line 7—7 of Fig. 6 and showing the switch in its normal or open position.

A further modification of the present invention is illustrated in Figs. 5, 6, and 7. In this particular embodiment the cup-shaped housing 90 is provided with apertured ears 91 to receive screws for attaching the housing to a suitable support. The housing 90 receives an insulating body 93 of hard insulating material formed with guide projections 94. A pair of conducting strip members are molded in the body 93. Each conducting strip is deformed to provide a socket portion 96, a straight portion 97, and an upright portion 98 extending beyond the inner face 99 of the body. The upright portion is bent inwardly to provide a relatively stationary contact surface 100 to be engaged by a bridging member 101. Referring to Fig. 6 the bridging member, in this instance, comprises a snap-acting member of dish-shape having a central strip 102, two side arcuate portions 103 and two arcuate end portions 104 all formed by spaced elongated slots 105. It is to be understood that the housing and bridging member could be, if desired, rectangular in shape. The arcuated end portions 104 are provided with guide notches 106 to receive the lugs 94 to guide the bridging member in its axial movements. The guide members also prevent the bridging member from moving laterally far enough to engage the upright portions 98. It will be noted that the strip portion 102, see Fig. 7, is deformed out of the normal arc of the dish-shaped member 101 in order that it will be longer than the apertures to insure snap-acting of the bridging member 101.

The bridging member 101 is held against the inner face 99 of the body 93 by a cup-shaped enclosure 110 having the same contour as the housing and is made of flexible material such as soft rubber. The enclosure 110 is provided with a peripheral flange 111 provided with a flat surface which contacts the flat surface 99 of the inner face of the body 93. The flat surfaces of the rim and body are such that when they contact each other they form an effective seal against air, gases or moisture. The enclosure 110 is held in assembled relation within the cup-shaped housing by a reduced portion 112 formed at the open end of the housing and which is bent inwardly against the outer surface of the enclosure.

Figure 8:
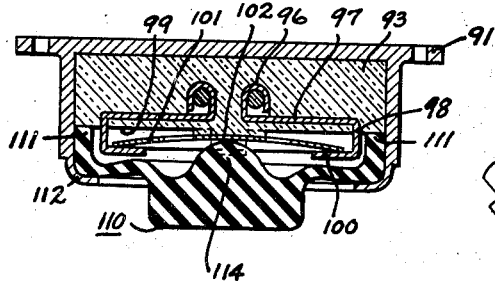
Fig. 8 is a sectional view taken on the line 8—8 of Fig. 6 but showing the switch in its closed position.

The enclosure 110 is provided with a bumper 114 which engages the strip 102 lightly to hold normally the bridging member 101 against the flat surface 99 to maintain the side arcuate portions 103 out of engagement with the contact surfaces 109. When the bumper is depressed manually to the position shown in Fig. 8 the central portion is subjected to stresses tending to reverse the curvature of the bridging member and as the strip 102 is moved toward the surface 99 of the body a condition is reached which causes the side and end portions 103 of the bridging member to snap out of engagement from the surface 99 with the side portions 103 engaging the contact surfaces 109. The snap motion is produced by the stored energy of the compressive force and the binding movement to which the bridging member 100 is subjected while in the state of unequal equilibrium. When the manual pressure is removed the bridging member will return to its normal state with a snap action.

Figure 9:
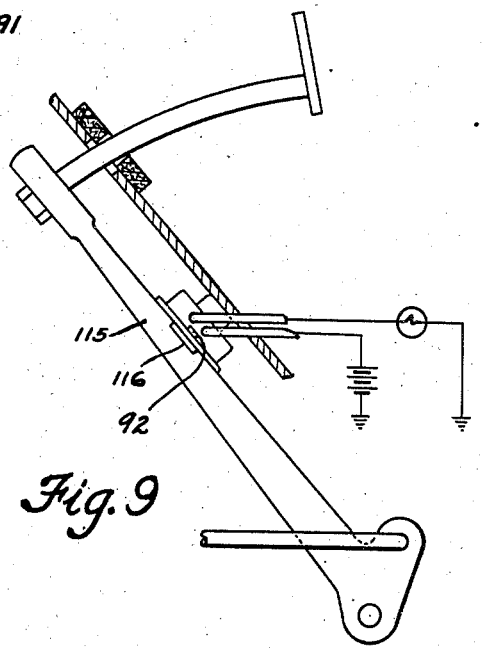
Fig. 9 is a diagrammatic view illustrating the switch attached to the pedal arm so that the switch operates as a rubber pedal bumper.

In Fig. 9 a different method of mounting the switch structure is shown and in this particular case the switch is mounted directly on a pedal 115 shown diagrammatically in Fig. 9. The pedal in this instance is provided with flanges 116 which act as a support for the switch housing. The housing is secured to the flanges 116 by screws 92 passing through the apertured ears which have threaded engagement with tapped openings in the flanges. The switch is mounted in such a manner that the bumper prevents the pedal from hitting the floor board when the operator removes his foot from the pedal. It is to be understood that when the switch is used as a circuit closer and a bumper the switch construction should be made of parts which will maintain the switch in an open position when the pedal is in its normal position, and when the pedal is moved a predetermined distance from its normal position the switch is snapped into its closed position.

Further objects and advantages of the present invention will be apparent from the following description, reference being had to the accompanying drawings wherein a preferred embodiment of the present invention is clearly shown.

What is claimed is as follows:

1. An electric switch comprising in combination; a dielectric base having bead portions projecting from one face thereof; spaced stationary contacts supported by the base; a dish-shaped snap-acting member having grooved portions for receiving the bead portions to prevent lateral movement of the snap-acting member relative to the base and having rim portions only normally engaging the fixed contacts to close a circuit; a resilient cup-shaped closure for the base, said closure having portions for engaging the disc to hold groove portions of the disc against the bead portions of the base and having another portion arranged in a position to engage portions of the disc remote from the groove portions to change the curvature thereof when external pressure is applied to the closure whereupon rim portions of the disc are snapped out of engagement from the stationary contacts to open the circuit.

2. A circuit controller comprising in combination; a base member of non-conducting material and provided with guide means; a plurality of spaced stationary contacts supported by the base; a metallic disc having recesses for receiving the guide means to prevent any appreciable lateral movement of the disc relative to the base and having rim portions so positioned with relation to the stationary contacts as to bridge same when in normal position; a cup-shaped resilient body member secured to the base member, said body having portions above the rim for engaging the disc; and means carried by the body positioned adjacent the central portion of the disc whereby external force applied to the body causes said means to press the disc until the rim portion snaps out of engagement from the stationary contacts and after the external force is released the disc returns to its normal position.

3. In an electrical switch, the combination of a base; spaced stationary contacts supported by the base; an annulus supported by the base; a snap-acting dish-shaped conducting member resting on the annulus so that periphery of the disc normally bridges the stationary contacts and adapted to change its curvature by external pressure; a yieldable closure of insulating material supported on the base, said closure having an annular portion for holding the disc against the annulus and having a central portion adjacent the central portion of the disc, said disc remaining in bridging position until the central portion of the closure is actuated by external pressure to change the normal curvature of the disc whereupon the periphery of the disc is snapped out of engagement from the stationary contacts, said disc returning to its normal curvature upon release of the external pressure to bridge the stationary contacts with a snap action.

4. In a hermetically sealed housing for a snap-acting metal disc the combination of a pair of members, one of said members being constructed of hard molding composition while the other is constructed of yieldable molding composition and of cup-shaped formation, said members forming a chamber and having inter-locking means for forming a seal between the members throughout their circumferences, said members being provided with raised arcuate portions extending toward each other between which is located the snap-acting disc, said disc having deformations which cooperate with the raised portions to prevent lateral movement of the disc within the housing; bumper means provided by the yieldable cup-shaped member capable of moving against the central area of the disc to deflect same inwardly and, by the flexure of said deflected portion the peripheral edge of the disc is snapped out of engagement from stationary contacts carried by the hard member; and external means for urging the bumper means against the disc said disc returning to its normal status upon release of the external means.

5. In a snap action switch which comprises a base, an annular supporting surface on said base having a fixed edge, a dish-shaped resilient member having an annular groove intermediate its central portion and its periphery for receiving the edge, said groove setting up stresses tending to bend the periphery out of the normal stable position but insufficient to do so without application of external force; a yieldable member for holding the disc against the edge; and an actuator associated with the yieldable member for engaging the central portion of the disc, said actuator being positioned for movement in such a manner that a relatively small movement thereof against the central portion of the disc will cause same to flatten and cause the disc beyond the edge to be actuated by a snap action, said disc returning by its own internal stresses to stable position when the external force is removed.

6. A snap action switch comprising, fixed contacts and an unattached bridging contact having a centrally, disposed normally bowed portion and fixed-contact engaging portions which are caused to move abruptly in response to a certain amount of decrease in the camber of the bowed portion; and a housing comprising two members clamped together adjacent their peripheries hermetically sealing the switch elements and having abutments extending toward each other for preventing the bridging contact from making any appreciable lateral movements within the housing, one of said members providing a flexible wall, the central portion of which will move inwardly in response to externally applied pressure and transmit movement to the bowed portion of the bridging contact to move the periphery of same from the fixed contacts.

7. A snap action switch comprising, a base of hard insulating material having portions projecting from one face thereof; spaced fixed contacts supported by the base; an unattached bridging contact having a bowed portion and fixed contact engaging portions which are caused to move abruptly in response to a certain amount of decrease in the camber of the bowed portion; yieldable housing means enclosing the switch elements, said housing having a flange provided with a face adapted for sealing contact with a surface on the base and having portions engageable with the bridging contact which cooperate with the projecting portions of the base for preventing any appreciable lateral movement of the bridging contact, said housing means also having an additional projecting portion which will move inwardly in response to externally applied pressure and transmit movement to the bowed portion of the bridging contact; and metallic means for moving the flange in axially directed abutment with the base for connecting the yieldable housing and the base together and also for enforcing fluid-tight contact with the base.

8. An electric switch comprising in combination, a base having projecting means extending from one face thereof; spaced stationary contacts carried by the base; an unsecured dish-shaped snap-acting member having provisions for receiving the projecting means to prevent lateral movement of the snap-acting member relative to the base, said member having rim portions capable of moving into and out of engagement with the stationary contacts; a yieldable body supported relative to the base and having portions for engaging the member for holding same against the projecting means and having a central portion adapted to engage the central portion of the member whereby as a result of the movement of the central portion of the body in one direction away from its normal position by an external force the curvature of the member is changed to set up stresses therein so that the rim portion is snapped from one position to another, and after the external force is removed the member returns to its normal status.

HOWARD K. GANDELOT.